UNITED STATES PATENT OFFICE.

FRANCIS STABLER, OF BALTIMORE, MARYLAND.

IMPROVED PROCESS FOR PRESERVING ANIMAL AND VEGETABLE SUBSTANCES.

Specification forming part of Letters Patent No. 50,965, dated November 14, 1865.

*To all whom it may concern:*

Be it known that I, FRANCIS STABLER, of Baltimore, in the county of Baltimore, in the State of Maryland, have invented a new and Improved Mode of Preserving Animal and Vegetable Substances Suitable for Food; and I do hereby declare that the following is a full and exact description thereof.

The nature of my invention consists in depriving animal or vegetable substances of water by means of salt or sugar, as the case may require, and then sealing them up in a tight vessel from which the air has been expelled without the use of heat. I take, for instance, oysters. I cover a table with a layer of dry salt, lay the oysters on the salt and cover them over with another layer of salt, allow them to stand two to four hours, and fill them into the cans with what salt adheres to them. Use a soda-fountain from which the air has been expelled by means of a jet of carbonic-acid gas to the inside bottom of the fountain, then proceed to fill the fountain with carbonic-acid gas, as they do in making soda or mineral water. When the fountain is charged with gas attach a draw-pipe to it, similar to that used for drawing soda-water. Introduce this pipe to the bottom of the can filled with oysters and allow the gas to flow until the air is expelled, which can be told by applying a lighted taper to the top of the can, when, if the can is full of gas, the taper will cease to burn, when you withdraw the pipe and seal up the can.

You proceed the same way with peaches, except use sugar in place of salt, and taking off the skin (and taking out the stone) to allow the sugar to act on the water in the peach.

I have given above the mode of applying my invention in the preservation of oysters and peaches. It may be applied to many other articles without any essential variation of detail, except such as will be obvious to persons skilled in the art of packing animal or vegetable substances for food.

I have described a convenient mode of introducing the gas, but do not limit myself to any particular manner, as many others are well known and can be used.

What I claim as my invention, and desire to secure by Letters Patent, is—

Preserving animal or vegetable substances used for food, when wholly or partially desiccated, by sealing it up in air-tight vessels and expelling the air by the substitution of gas that will not support combustion, substantially as described.

FRANCIS STABLER.

Witnesses:
GEORGE H. CLARKE,
T. H. SYPHERD.